July 26, 1955 R. C. BAIRD 2,714,048

MAGNETIC RECORDING AND REPRODUCING APPARATUS

Filed Sept. 15, 1952

RAYMOND C. BAIRD,
INVENTOR.

BY Healvin White

ATTORNEY.

United States Patent Office 2,714,048
Patented July 26, 1955

2,714,048

MAGNETIC RECORDING AND REPRODUCING APPARATUS

Raymond C. Baird, Los Angeles, Calif., assignor to The Fluor Corporation, Ltd., Los Angeles, Calif., a corporation of California Application September 15, 1952, Serial No. 309,722
10 Claims. (Cl. 346—74)

This invention relates to improved electro-magnetic transducing apparatus, i. e. apparatus for magnetically recording or reproducing signals by effecting conversion of an electric signal to a magnetic signal, or vice versa. As will become apparent, the invention is broadly applicable to any of various recording and/or reproducing uses, but in certain specific respects is particularly adapted for use in forming pressure diagrams of a piston and cylinder mechanism.

A major object of the present invention is to provide magnetic recording apparatus which is capable of functioning at one speed during a recording operation, and then at a considerably reduced speed when the recorded signal is being reproduced or "read out" from the record track. Such reduced speed reproduction permits an operator to examine the reproduced signal more closely than otherwise would be possible, and where the signal is being utilized to actuate an electric or other recorder, enables a more accurate response of the recorder to the signal variations. One particular reason for which I have desired a reduced signal read-out speed has been to permit the actuation of a plotting device by a signal representing cylinder pressures, where the pressure variations as they actually occur are far too rapid for the plotter to follow.

Conventional magnetic tape, wire, or other recorders are not capable of reproducing a record signal at a substantially reduced speed because the generation of output current in such a device is directly dependent on the rate of motion of the record "track." This is true because the output current is actually generated by changes in magnetic flux density through a signal pick-up head as variably magnetized portions of the tape or other track move past the head. In the present apparatus, on the other hand, the output signal is not at all dependent on movement of the record medium. This result is achieved by effecting a vibratory movement of the signal pick-up head, which acts to continually change the flux density through the head irrespective of movement of the record medium, so that even with the medium stationary, an output is produced which is proportional to and accurately represents the magnetic signal on the portion of the tape which is then adjacent the head.

The pick up head includes a coil positioned in flux linkage relationship to a localized portion of the tape, and preferably associated with a magnetic metal member which acts to conduct the tape flux through the coil. Either the coil or the magnetic metal member and preferably both, are vibrated relative to the tape. It is found that vibratory movement is by far the most effective type of movement for the purpose, since it enables very rapid movement of the head relative to the tape while maintaining the head at substantially a fixed location at all times.

A further feature of the invention involves the provision of apparatus for recording, on a single tape or other record track, of two synchronized signals or records, representing for example the cylinder chamber pressures and piston displacement of a piston and cylinder mechanism. These two synchronized signals may then be taken from the recording medium to actuate a plotter for producing an accurate diagram of the pressure cycle. Structurally, I employ for this purpose apparatus including two electromagnetic transducer heads coacting respectively with different portions of the record track which are relatively offset transversely of its path of movement. For amplifying both of the signals when they are being read from the track, both heads may be vibrated in the manner previously discussed, the heads preferably being interconnected for vibration in unison by a common vibrator.

The above and other features and objects of the present invention will be better understood from the typical embodiment illustrated in the accompanying drawing, in which.

Figures 1, 2, 3:
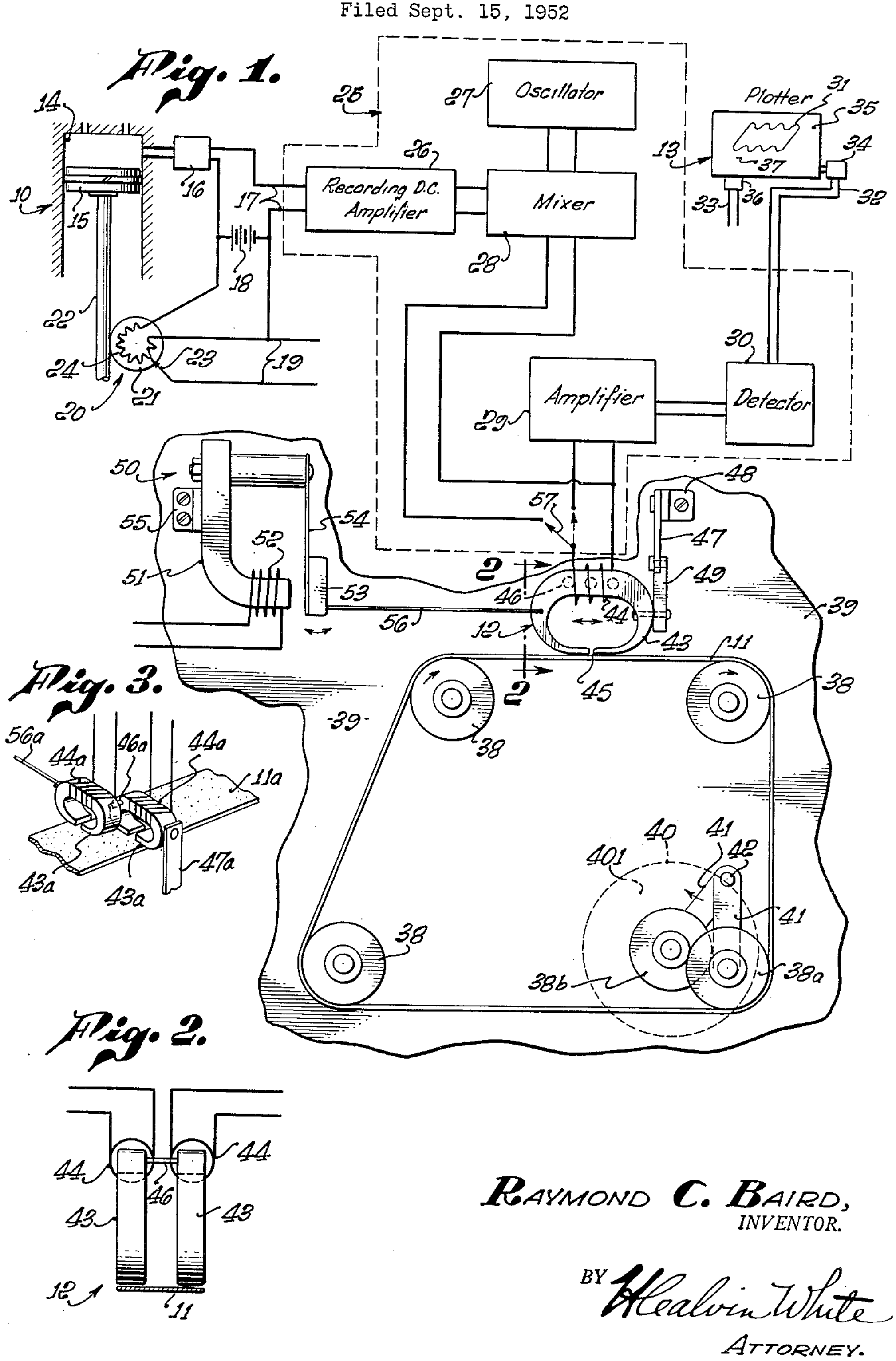
Fig. 1 is a partially schematic view of a cylinder pressure recording system embodying the invention.
Fig. 2 is a side view of the magnetic recording and reproducing head assembly of Fig. 1.
Fig. 3 is a fragmentary perspective view of a variational form of recording and pick-up head assembly.

Referring first to Fig. 1, the apparatus there shown includes a piston and cylinder mechanism 10, a pressure cycle of which is to be first recorded on a magnetic tape 11 by a magnetic recording and reproducing head 12, and subsequently reproduced at a reduced speed by an X—Y plotter 13. Mechanism 10 may typically be a reciprocating pump, compressor, engine or the like, and comprises a cylinder 14 and a relatively reciprocating piston 15. A transducer 16 of conventional construction is connected to cylinder 14 in communication with the cylinder chamber, and acts to produce in leads 17 an electric signal of a voltage varying in exact accordance with pressure variations in the cylinder chamber. The energy for the pressure controlled signal is supplied by a battery 18.

A second electric signal varying in accordance with piston displacement is delivered to leads 19 from a pick-up device 20, which is more specifically described and claimed in my copending application Serial Number 283,407, filed April 21, 1952 on Self-Synchronizing Horsepower Indicator. Device 20 comprises a wheel 21 frictionally engaging piston rod 22 and rotatably oscillated in accordance with the axial reciprocation of the piston rod. The rotary contact 23 of a potentiometer whose resistance element is indicated at 24 is rotated by and in accordance with wheel 21, to produce the desired displacement varied signal in leads 19. Potentiometer 23, 24 may be energized by the same battery 18 as transducer 16.

The two synchronized electric signals are fed from leads 17 and 19 respectively to recording head assembly 12, and subsequently from head assembly 12 to plotter 13, through two separate but identical electronic systems. In view of the fact that these systems are identical, only one has been shown, it being shown in the broken line box 25 to indicate what portion of the apparatus is duplicated. Also, since this electronic apparatus is entirely conventional, it has been represented merely schematically, to simplify the drawing. Describing briefly the electronic apparatus within broken lines 25, it includes the usual recording amplifier 26, oscillator 27 and mixer 28, by which the signal is fed from lines 17 to head assembly 12 during recording, and an amplifier 29 and detector 30 through which a signal from head assembly 12 is subsequently fed to the plotter.

Plotter 13 is of a conventional type which is operable to produce a graph 31 (in this case a horsepower curve) representing the variations in two synchronized electric signals fed to it through leads 32 and 33. The signal from leads 32 is fed from head assembly 12 through the illustrated amplifier 29 and detector 30, and has a voltage varying in accordance with the variations in pressure in the cylinder chamber of mechanism 10. This signal in lines 32 controls the vertical or Y-axis displacement of the line forming graph 31. Such control of the vertical displacement may be effected by means of a motor 34 energized by the signal from lines 32, and acting to control the vertical displacement of a sheet of graph paper 35 in the plotter.

The signal to leads 33 is fed from head assembly 12 through an amplifier and detector corresponding to those illustrated at 29 and 30, and has a voltage varying in accordance with the displacement of piston 15. This signal controls the horizontal or X-axis displacement of the line forming curve 31, typically by means of a motor 36 operable to horizontally displace a marking pen 37 which forms the graph line on paper 35.

Tape 11 is of a magnetizable flexible material and preferably takes the form of an endless loop, with the length of the tape being at least long enough to carry the record of one complete cycle of cylinder pressures. That is, the tape is of such a length that one complete cycle of its endless movement (at recording speed) takes a period at least as long as a cycle of cylinder pressures in mechanism 10. The tape is mounted for endless movement about three rollers 38, which are rotatably mounted to a base member 39, and a pair of selectively useable drive rollers 38*a* and 38*b*. The two drive rollers 38*a* and 38*b* are continuously driven at low and high speeds respectively by any suitable type of power unit. This power unit may include an electric motor 40 and a transmission, typically illustrated at 401, acting to drive the rollers 38*a* and *b* from the motor at two different speeds. Each of these rollers is mounted by an arm 41, pivoted to base 39 at 42, for swinging movement into and out of active driving engagement with tape 11.

Head assembly 12 includes two identical recording and reproducing heads positioned one directly beneath or behind the other, and each including a magnetic metal member 43, and a coil 44. Each of the magnetic metal members 43 may typically be formed of a relatively soft iron, and have essentially the loop shape shown in Fig. 1. Directly adjacent tape 11, the magnetic metal members 43 have air gaps 45, to form at opposite sides of the gap a pair of poles positioned in flux linkage relationship with a localized edge portion of the tape. Coils 44 extend about the two magnetic metal members at locations opposite air gaps 45. The two magnetic metal members 43 are spaced sufficiently apart (see Fig. 2) to avoid substantial flux leakage from one member to the other, and are rigidly interconnected in fixed relation by a pair of non-magnetic rigid connectors 46. The air gaps and pole portions of the two magnetic metal members are positioned adjacent the two opposite edge portions of tape 11.

Members 43 and coils 44, which are carried about the members in fixed relation, are mounted by a leaf spring 47 for vibratory movement as a unit relative to tape 11. Spring 47 may typically be attached at one end to base 39, as by an angle bracket 48, and its other end may be attached to the two members 43 by a rigid non-magnetic element 49.

The head assembly is vibrated at a constant rate longitudinally of tape 11 by a vibrator 50, including a magnetic metal pole piece 51, a coil 52 supplied with an alternating current and a magnetic metal armature 53 mounted by spring 54 for vibratory movement in accordance with alternations of the coil energizing circuit. Pole piece 51 may be rigidly attached to base 39 by a suitable angle bracket 55. Armature 53 is connected to one or both of the magnetic metal head members 43 by a wire 56 or other connecting element, acting to transmit the vibrations of the armature to the head assembly.

Each of the two coils 44 of the two recording and reproducing heads is selectively electrically connectible to either a corresponding one of the input mixers (for recording) or the corresponding output amplifier 29 (for actuating plotter 13). For controlling which of these circuits the coils are connected into, the electronic apparatus associated with each coil includes a switch 57, which in its full-line position of Fig. 1 connects the coil to the recording circuit, and in its broken-line position connects the coil to the plotter actuating circuit.

In making a record of a cycle of pressures of piston and cylinder mechanism 10, rollers 38*a* and 38*b* are first moved to positions in which the latter engages tape 11 to continuously progressively longitudinally advance it rather rapidly. During the first recording portion of the operation, vibrator 50 is deenergized so that head assembly 12 remains stationary. The two switches 57 are then actuated to their full-line positions of Fig. 1, to conduct to the coils 44 electric signals varying in accordance with cylinder chamber pressure and piston displacement respectively. Such energization of coils 44 acts to form along the opposite edges of tape 11 two series of magnetic impressions, varying in intensity in accordance with chamber pressure and piston displacement.

After the two magnetic impressions or records are formed on tape 11, switches 57 are turned to their broken-line plotter actuating positions, and vibrator 50 is energized to effect vibratory movement of head assembly 12. Drive rollers 38*a* and 38*b* are then reversed in position, so that the former acts to drive the tape, at a considerably slower speed than that effected by roller 38*b* during recording. As tape 11 advances past the gaps 45 of the two magnetic heads, the various differently magnetized portions of the tape successively move to locations opposite the head gaps, to cause magnetic fields of varying intensity to pass through the magnetic metal members 43. The changes in magnetic flux passing through members 43 and their coils 44 induce currents in the coils, which are utilized to energize plotter 13 and cause it to form the horsepower curve 31.

Since the value of the output currents induced in coils 44 is dependent upon the rate of change of the flux passing through the coils, the reduced rate of advancement of tape 11 when actuating the plotter would, unless otherwise compensated for, result in a reduction in output current to a value insufficient to properly actuate the plotter. It is for this reason that the head assembly 12 is continuously vibrated at a constant rate by vibrator 50 during actuation of the plotter, so that the vibratory movement of magnetic metal pole member 43 relative to the tape is superimposed on the slow rate of movement of the tape itself, to greatly increase the rate of flux change in the heads, and thereby produce output currents in lines 32 and 33 sufficient to actuate the plotter.

Fig. 3 represents the recording and pick-up assembly of a variational form of the invention, in which the heads vibrate transversely rather than longitudinally of the tape 11*a*. In this form of the invention, the magnetic portions 43*a* of the heads, carrying coils 44*a*, are rigidly interconnected by a non-magnetic member 46*a* and mounted for vibratory movement by a spring 47*a*. The air gaps of the two heads are positioned opposite the two edges respectively of the tape. The heads are vibrated by a vibrator (not shown) through a wire 56*a*. Except for the differences brought out in Fig. 3, this second form of the invention would of course correspond to the Fig. 1 form.

I claim :

1. Apparatus comprising means operable to progressively advance a magnetic record track along a predetermined path, two electromagnetic signal pick-up heads positioned in flux linkage relationship to different relatively offset portions of said track so that the two heads are associated respectively with two different series of magnetic signals along said track, a common indicator responsive to energization of both of said heads by said magnetic signals and operable to produce a composite graphical indication of said two series of signals together, and means operable to relatively move said pickup heads with respect to said record track through predetermined repeating cycles as the track is advanced and in addition to said advancing movement to amplify the signals to said indicator.

2. Apparatus as recited in claim 1, in which said heads are mounted for vibratory movement, said last mentioned means comprising vibrator means acting to vibrate said heads relative to said advancing record track.

3. Apparatus as recited in claim 2, in which said vibrator means comprise a common vibrator acting to vibrate both of the heads in unison.

4. Apparatus as recited in claim 2, in which said indicator comprises a common X—Y plotter responsive to energization of both of said heads.

5. Apparatus as recited in claim 2, in which said apparatus functions as both a recording and reproducing device and includes means operable to record two series of magnetic signals along said two portions of the record track, said track advancing means being constructed to advance said track at a first relatively fast speed for recording and a second relatively slow speed for reproduction by said indicator.

6. Apparatus as recited in claim 5, in which said pickup heads function as recording heads and thus as portions of said recording means during a recording operation.

7. Apparatus as recited in claim 5, in which said means for relatively moving the heads and track comprise vibrator means operable to vibrate the head relative to the advancing track.

8. Apparatus as recited in claim 1, including leaf spring means mounting said heads for vibration in unison, said last mentioned means including an electric vibrator acting to vibrate the heads as permitted by said spring means.

9. Apparatus for recording the cylinder pressures of a piston and cylinder mechanism comprising means for producing a first electric signal varying in accordance with said cylinder pressure, means for producing a second electric signal varying in accordance with the displacement of the piston in said mechanism, means for progressively advancing an elongated magnetic record track along a predetermined path, two vibratable electromagnetic recording and pick-up heads positioned in flux linkage relationship to different portions of said track relatively offset transversely of said path, means for conducting said first and second electric signals to said two heads respectively as said track advances to impress on said track two different series of magnetic signals representing said cylinder pressures and piston displacement respectively, an X—Y plotter controlled by electric signals produced by said heads upon movement of said track along said path following the formation of said magnetic signals on the path and acting to produce a graph representing a cycle of the cylinder chamber pressures, and vibrator means operable to vibrate said heads to amplify the signals to said X—Y plotter.

10. Apparatus as recited in claim 9, in which each of said heads comprises an essentially horseshoe shaped magnetic metal body having two proximately positioned poles located directly adjacent one of said portions of the track, and a coil extending about said magnetic metal body, said apparatus including leaf spring means mounting said heads for vibratory movement, a connection interconnecting the heads for vibratory movement together, said vibrator means comprising an electric alternating current energized vibrator acting to vibrate the heads in unison.

References Cited in the file of this patent

UNITED STATES PATENTS

| | | |
|---|---|---|
| 2,512,015 | Graveel | June 20, 1950 |
| 2,561,338 | Camras | July 24, 1951 |

FOREIGN PATENTS

| | | |
|---|---|---|
| 884,881 | France | May 10, 1943 |